United States Patent
Seymour et al.

(10) Patent No.: US 8,266,177 B1
(45) Date of Patent: Sep. 11, 2012

(54) EMPIRICAL DATABASE ACCESS ADJUSTMENT

(75) Inventors: Harlan Seymour, San Mateo, CA (US); Sourabh Satish, Mountain View, CA (US); Anne Yeh, Fremont, CA (US); Benjamin Yeung, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 1876 days.

(21) Appl. No.: 10/802,646

(22) Filed: Mar. 16, 2004

(51) Int. Cl.
*G06F 7/00* (2006.01)
*G06F 17/30* (2006.01)

(52) U.S. Cl. ....................................................... 707/783

(58) Field of Classification Search .......... 707/781–783, 707/999.009
See application file for complete search history.

(56) References Cited

U.S. PATENT DOCUMENTS

| | | | |
|---|---|---|---|
| 4,959,849 A | 9/1990 | Bhusri | |
| 5,040,214 A | 8/1991 | Grossberg et al. | |
| 5,355,474 A | 10/1994 | Thuraisngham et al. | |
| 5,584,024 A | 12/1996 | Shwartz | |
| 5,664,172 A | 9/1997 | Antoshenkov | |
| 5,742,806 A | 4/1998 | Reiner et al. | |
| 5,768,422 A | 6/1998 | Yaeger | |
| 5,826,076 A | 10/1998 | Bradley et al. | |
| 6,088,803 A | 7/2000 | Tso et al. | |
| 6,128,740 A | 10/2000 | Curry et al. | |
| 6,311,278 B1 | 10/2001 | Raanan et al. | |
| 6,314,409 B2 | 11/2001 | Schneck et al. | |
| 6,356,887 B1 | 3/2002 | Berenson et al. | |
| 6,584,569 B2 | 6/2003 | Reshef et al. | |
| 6,598,038 B1 | 7/2003 | Guay et al. | |
| 6,775,657 B1 | 8/2004 | Baker | |
| 6,775,827 B1 | 8/2004 | Harkins | |
| 6,839,850 B1 | 1/2005 | Campbell et al. | |
| 6,928,553 B2 | 8/2005 | Xiong et al. | |
| 7,050,936 B2 | 5/2006 | Levy et al. | |
| 7,085,780 B2 | 8/2006 | Sakamoto et al. | |
| 7,085,928 B1 | 8/2006 | Schmid et al. | |
| 7,120,645 B2 | 10/2006 | Manikutty et al. | |
| 7,120,933 B2 | 10/2006 | Mattsson | |
| 7,185,232 B1 | 2/2007 | Leavy et al. | |
| 7,237,265 B2 | 6/2007 | Reshef et al. | |
| 2002/0065896 A1 | 5/2002 | Burakoff et al. | |
| 2002/0083343 A1 | 6/2002 | Crosbie et al. | |
| 2002/0087882 A1 | 7/2002 | Schneider et al. | |

(Continued)

FOREIGN PATENT DOCUMENTS

WO    WO 01/71499 A1    9/2001

OTHER PUBLICATIONS

Chung, C.Y. et al., "DEMIDS: A Misuse Detection System for Database Systems," Department of Computer Science, University of California at Davis, Oct. 1, 1999, pp. 1-18.

(Continued)

*Primary Examiner* — Alicia Lewis
(74) *Attorney, Agent, or Firm* — Fenwick & West LLP

(57) ABSTRACT

Computer implemented methods, apparati, and computer-readable media for empirically adjusting access to a database (1). An apparatus embodiment comprises: coupled to the database (1), a database discovery module (11) for determining authorized accesses to the database (1); coupled to the database (1), a command monitoring module (12) for monitoring actual accesses to the database (1); and coupled to the database discovery module (11) and to the command monitoring module (12), an analysis module (13) for comparing actual accesses with authorized accesses.

20 Claims, 2 Drawing Sheets

U.S. PATENT DOCUMENTS

| | | | |
|---|---|---|---|
| 2002/0157020 A1 | 10/2002 | Royer | |
| 2003/0037251 A1 | 2/2003 | Frieder et al. | |
| 2003/0051026 A1 | 3/2003 | Carter et al. | |
| 2003/0069880 A1 | 4/2003 | Harrison et al. | |
| 2003/0101355 A1* | 5/2003 | Mattsson | 713/200 |
| 2003/0133554 A1 | 7/2003 | Nykanen et al. | |
| 2003/0145226 A1 | 7/2003 | Bruton et al. | |
| 2003/0154402 A1 | 8/2003 | Pandit et al. | |
| 2003/0167229 A1* | 9/2003 | Ludwig et al. | 705/40 |
| 2003/0188189 A1 | 10/2003 | Desai et al. | |
| 2003/0204719 A1 | 10/2003 | Ben-Itzhak | |
| 2003/0221123 A1 | 11/2003 | Beavers | |
| 2004/0098617 A1 | 5/2004 | Sekar | |
| 2004/0098623 A1 | 5/2004 | Scheidell | |
| 2004/0193656 A1 | 9/2004 | Pizzo et al. | |
| 2004/0199535 A1 | 10/2004 | Zuk | |
| 2004/0205360 A1 | 10/2004 | Norton et al. | |
| 2004/0220915 A1 | 11/2004 | Kline et al. | |
| 2004/0250127 A1 | 12/2004 | Scoredos et al. | |
| 2004/0250134 A1 | 12/2004 | Kohler et al. | |
| 2004/0260945 A1 | 12/2004 | Raikar et al. | |
| 2005/0086529 A1 | 4/2005 | Buchsbaum | |
| 2005/0097149 A1* | 5/2005 | Vaitzblit et al. | 707/202 |
| 2005/0138006 A1 | 6/2005 | Bennett et al. | |
| 2005/0138426 A1 | 6/2005 | Styslinger | |
| 2005/0154733 A1 | 7/2005 | Meltzer et al. | |
| 2005/0203886 A1 | 9/2005 | Wong | |
| 2005/0203921 A1 | 9/2005 | Newman et al. | |
| 2005/0273859 A1 | 12/2005 | Chess et al. | |
| 2005/0289187 A1 | 12/2005 | Wong et al. | |
| 2006/0070128 A1 | 3/2006 | Heimerdinger et al. | |
| 2006/0117386 A1 | 6/2006 | Gupta et al. | |
| 2006/0212438 A1 | 9/2006 | Ng | |
| 2006/0212941 A1 | 9/2006 | Bronnikov et al. | |
| 2006/0242136 A1 | 10/2006 | Hammond et al. | |
| 2007/0074188 A1 | 3/2007 | Huang et al. | |
| 2007/0094728 A1 | 4/2007 | Julisch et al. | |
| 2007/0169194 A1 | 7/2007 | Church et al. | |

OTHER PUBLICATIONS

Krügel, C. et al., "A Survey on Intrusion Detection Systems," Distributed Systems Group, Technical University of Vienna, Dec. 12, 2000, pp. 1-36.

Lee, S.Y. et al., "Learning Fingerprints for a Database Intrusion Detection System," ESORICS 2002, LNCS 2502, pp. 264-279, Nov. 2002, Springer-Verlag, Germany.

Low, W.L. et al., "DIDAFIT: Detecting Intrusions in Databases Through Fingerprinting Transactions," ICEIS 2002—Databases and Information Systems Integration, 2002, pp. 121-128.

Ramasubramanian, P. et al., "Quickprop Neural Network Ensemble Forecasting Framework for a Database Intrusion Prediction System," Neural Information Processing—Letters and Reviews, Oct. 2004, pp. 9-18, vol. 5, No. 1.

Valeur, F. et al, "A Learning-Based Approach to the Detection of SQL Attacks," Proceedings of the Conference on Detection of Intrusions and Malware & Vulnerability Assessment (DIMVA), Vienna, Austria, Jul. 2005, 18 pages.

Rees Johnson, Protecting Your Data and Your Microsoft SQL Server, Entercept Security Technologies, p. 1-12 [online], Oct. 2, 2002, [retrieved on Jan. 30, 2004]. Retrieved from the Internet:: <URL: http://networkassociates.com/us/tier2/products/media/mcatee/wp-sq/protection.pdf>.

Solutions by Tech Target, Entercept Database Edition, Nov. 2002, [retrieved on Jan. 9, 2004]. Retrieved from the Internet: <URL: http//infosecuritymag.techtarget.com/2002/nov/solutions.shtml>.

AirCERT web page, last updated Sep. 18, 2000 [online]. Cert.org [retrieved Apr. 18, 2003]. Retrieved from the Internet<URL:http://www.cert.org/kb/aircert/>.

Analysis Console for Intrusion Detection (ACID) web page [online]. Andrew.cmu.edu [retrieved Apr. 18, 2003]. Retrieved from the Internet<URL:http://www.andrew.cmu.edu/~rdanyliw/snort/snortacid.html>.

"Caltarian Security Technology Platform," Riptech web pages [online]. Symanec.com [retrieved Apr. 18, 2003]. Retrieved from the Internet<URL:http://wnterprisesecurity.symantec.com/Content/displayPDF.cfm?SSSPDFID=35&EID=O>.

Change log for Analysis Console for intrusion Detection (ACID), indicating release date of Sep. 8, 2000 [online]. Andrew.cmu.edu [retrieved Apr. 18, 2003]. Retrieved from the Internet<URL:http://www.andrew.cmu.edu/~rdanyliw/snort/CHANGELOG>.

CyberGuard Corporation, "CyberGuard and Webwasher: The Value Proposition," A CyberGuard Corporation White Paper, May 2004, 6 pages.

e=Security, Inc., Correlation Technology for Security Event Management. Oct. 7, 2002 [online]. eSecurityins.com [retrieved Apr. 18, 2003]. Retrieved from the Internet<URL:http://www.esecurityinc.com/downloads/Correlation_WP.pdf>.

Marketing, "Digital Certificates—Best Practices—A Microdasys Whitepaper," bestpractice.doc, Revision 1.1 (Jul. 31, 2003), 6 pages, Czech Republic.

Microdasys, "S C I P Secured Content Inspection: Protecting the Enterprise from CryptoHacks," 2003 by Microdasys Inc., 2 pages, Czech Republic.

MyNetWatchman.com web pages indicating 9/00 beta release [online]. MyNetWatchman.com [retrieved Apr. 18, 2003]. Retrieved from the Internet<URL:http://www.mynetwatchman.com/mynetwatchman>.

Network Computing Solutions—"Microdasys SCIP" [online]. Retrieved on Mar. 18, 2005. Retrieved from the Internet<URL:http://www.ncs/cz/index.php?language=en&menuitem-4&subitem=13>, 2 pages, Czech Republic.

Network Computing Solutions—NSC Homepage—News [online]. Retrieved on Mar. 18, 2005. Retrieved from the Internet<URL:http:/nsc.cz/index/php?language=en&menuitem=0&subitem=4 &subitem=13>, 3 pages, Czech Republic.

Parkhouse, Jayne, "Pelican Save TNet 2.0," [online] Jun. 2000, SC Magazine Product Review, [retrieved Dec. 1, 2003] Retrieved from the Internet<URL:http://www.scmagazine.com/standalone/pelican/sc_pelican.html>.

"PostgreSQL Interactive Documentation," May 2001, [online] [Archived by http://archive.org on Jun. 6, 2001; Retrieved on Dec. 19, 2006] Retrieved from the Internet<URL:http://web.archive.org/web/20010606011227/www.postgresql.org/idocs/index.php?overv...>.

2000 Review of eSecurity product on Network Security web page [online]. SCMagazine.com [retrieved Apr. 18, 2003]. Retrieved from the Internet<URL:http://www.scmagazine.com/scmaqazine/2000_12/testc/network.htm#Open>.

Schneier, Bruce, Managed Security Monitoring: Network Security for the 21st Century, 2001 [online]. Conterpane.com [retrieved Apr. 18, 2003]. Retrieved from the Internet<URL:http://www.counterpane.com/msm.pdf>.

SCIP Product, Microdasys—"The need to control, inspect and manage encrypted webtraffic." [online]. Retrieved on Mar. 18, 2005. Retrieved from the Internet<URL:http://www.microdasys.com/scipproduct+M54a708de802.html>. Author unknown, 2 pages, Czech Republic.

Slashdot.org web pages describing Dshield, dated Nov. 27, 2000 [online]. Slashdot.org [retrieved Apr. 18, 2003]. Retrieved from the Internet<URL:http://slashdot.org/article.pl?sid=00/11/27/1957238 &mode=thread>.

SSL Stripper Home Page, "Security Solutions: Sample Screenshots," [online]. Retrieved on Mar. 18, 2005. Retrieved from the Ineternet<URL:http://www.vroyer.org/sslstripper/index.html>, 2 pages, Oct. 15, 2004, U.S.A.

"SSL Stripper Installation Guide," [online]. Retrieved in Mar. 2005 from the Internet<URL:http://www.sslstripper.com>, 2 pages, U.S.A.

SSL Stripper Sample Screenshots. "Security Solutions: Sample Screenshots," [online]. Retrieved on Mar. 18, 2005. Retrieved from the Internet<URL:http://www.vroyer.org/sslstripper/screenshots.html>, 3 pages, Oct. 15, 2004, U.S.A.

Symantec™ Incident Manager http://enterprisesecurity.symantec.com, copyright date Jun. 2003.

Web page, announcing Nov. 11, 2000 release of Dshield [online]. Deja.com [retrieved Apr. 18, 2003]. Retrieved from the Internet<URL:http://groups/google.com/
groups?selm=8vm48v%245pd%241%40nnrp1.deja.com
&oe=UTF-8&output=gplain>.
Webwasher AG/Full feature set, "Full feature set," [online]. Retrieved on Mar. 18, 2005. Retrieved from the Internet<URL:http://www.webwasher.com/enterprise/products/webwasher_products/ssl_scanner/full_feature_set..html?l...>, 2 pages.
Webwasher AG/Webwasher Anti Spam, "Webwasher Anti Spam" [online]. Retrieved on Mar. 18, 2005. Retrieved from the Internet<URL:http://www.webwasher.com/enterprise/products/webwasher_products/anti_spam/index.htm...>, 1 page.
Webwasher AG/Webwasher Anti Virus, "Webwasher Anti Virus," [online]. Retrieved on Mar. 18, 2005. Retrieved from the Internet<URL:http://www.webwasher.com/enterprise/products/webwasher_products/anti_virus/index.html..>, 2 pages.
Webwasher AG/Webwasher Content Protection, "Webwasher Content Protection," [online]. Retrieved on Mar. 18, 2005. Retrieved from the Internet<URL:http://www.webwasher.com/enterprise/products/webwasher_products/content_protection/index.html>, 2 pages.
Webwasher AG/Webwasher 1000 CSM Appliance, "Webwasher 1000 CSM Appliance," [online]. Retrieved on Mar. 18, 2005. Retrieved from the Internet<URL:http://www.webwasher.com/enterprise/products/webwasher_products/scm_appliance/index...> 2 pages.
Webwasher AG/Webwasher SSL Scanner, "Webwasher SSL Scanner," [online]. Retrieved on Mar. 18, 2005. Retrieved from the Internet<URL:http://www.webwasher.com/enterprise/products/webwasher_products/ssl_scanner/index.html>, 2 pages.
Webwasher AG/Webwasher URL Filter, "Webwasher URL Filter," [online]. Retrieved on Mar. 18, 2005. Retrieved from the Internet<URL:http://www.webwasher.com/enterprise/products/webwasher_products/webwasher_url_filter..>, 1 page.
Archive of "Postgre SQL 7.1 Documentation," www.postgresql.org, [online] [Archived by http://archive.org on Jun. 6, 2001; Retrieved May 2001] Retrieved from the Internet<URL:http://web.archive.org/web/20010606011227/www.postgresql.org/idocs/index.php?overv...>.
Halfond, G.J. et al., "Combining Static Analysis and Runtime Monitoring to Counter SQL-Injection Attacks," Workshop on Dynamic Analysis (WODA 2005), May 17, 2005, St. Louis, MO, USA, pp. 1-7.
Kruegel, C. et al., "Anomaly Detection of Web-Based Attacks," CCS'03, Oct. 27-31, 2003, ACM, pp. 251-261.
Oracle, "Understanding Query Expressions, "Oracle 8 ConText Cartridge Application Developer's Guide, Release 2.3, 1997, [online] [Retrieved on Mar. 9, 2007] Retrieved from the Internet<URL:http://download-east.oracle.com/docs/cd/A58617_01/cartridg.804/a58164/ch03.htm>.
Pfleeger, Charles P., "Security in Computing," $2^{nd}$ edition, 1996, pp. 426-433.
Weisstein, E.W., "The CRC Concise Encyclopedia of Mathematics," 1998, p. 1726.

\* cited by examiner

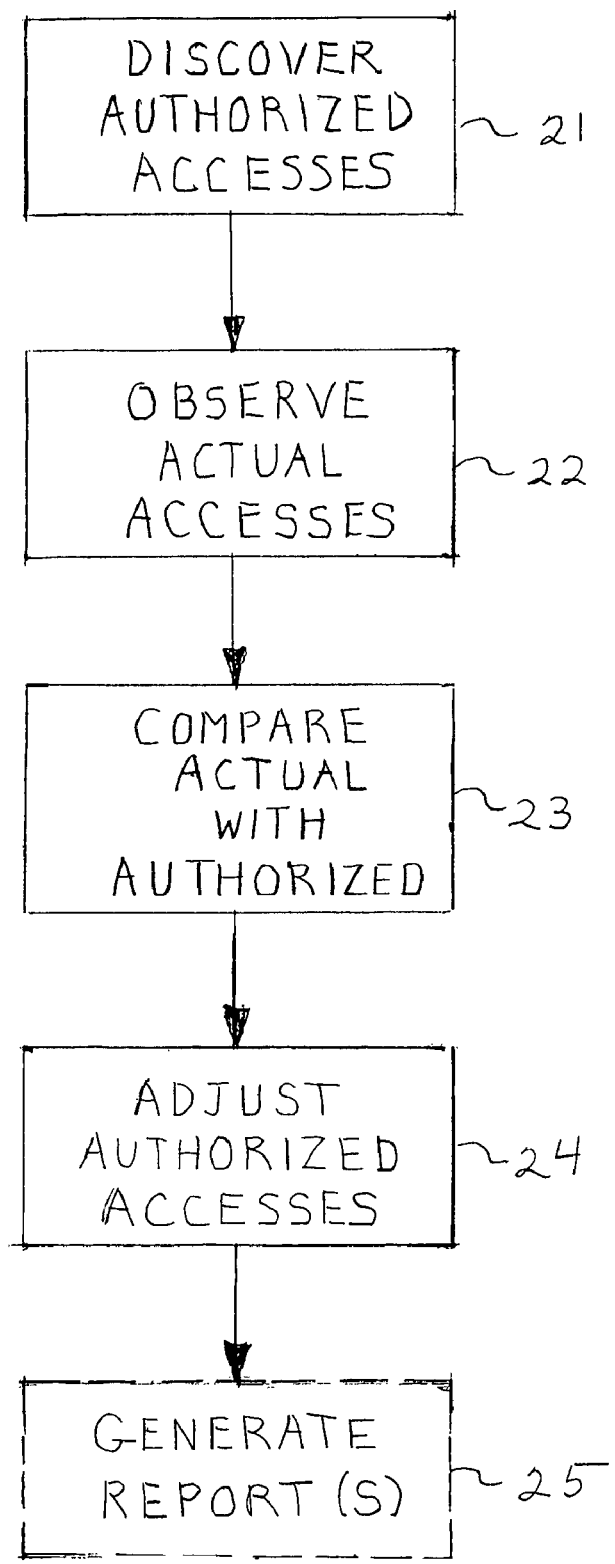

EMPIRICAL DATABASE ACCESS ADJUSTMENT

RELATED APPLICATIONS

Commonly assigned U.S. patent application Ser. No. 10/612,198 filed Jul. 1, 2003, entitled "Real-Time Training for a Computer Code Intrusion Detection System" and commonly assigned U.S. patent application Ser. No. 10/632,857 filed Jul. 31, 2003, entitled "Computer Code Intrusion Detection System Based on Acceptable Retrievals" are hereby incorporated by reference in their entireties into the present patent application.

TECHNICAL FIELD

This invention pertains to the field of thwarting intrusions to computer databases perpetrated by malicious attackers.

BACKGROUND ART

Databases are perhaps the most critical resource of an enterprise, and therefore it is of prime importance to secure them. Standard database products have access control interfaces for setting permissions on the defined tables and columns of the database. Such access control interfaces can allow, deny, or revoke permissions for a given user and for a given operation on each database table and column.

Databases are managed by database administrators (DBAs), who determine access control settings for the database by participating in the design and implementation of the applications using the database and/or by reviewing suggestions made by the application developer or provider. The DBA obtains knowledge of users, groups, roles, and applications accessing the database. This information is not always readily and easily available.

In any case, the access control settings are configured on the basis of perceived application behavior, i.e., the application is expected to access specific parts of the database for specific operations, and as such, the DBA chooses to apply relevant access control settings. This process is complicated, since database applications are typically huge, with many components developed by large teams. Thus, to consolidate all the features to focus access to parts of the database for specific operations is almost impossible. As a result, it is often the case that unnecessarily loose (open) access control settings are applied to the database to account for the various unknowns.

These loose access control settings give rise to concerns that malicious individuals are thereby able to access parts of the database that could have been protected without disturbing access by benign individuals (or applications). They are not prevented from doing so by conventional techniques, since said access is within the bounds of permissible access settings as originally configured by the DBA.

What is needed is a solution for ensuring that minimal access control settings are applied to the database, so that each application can continue to function as usual, while avoiding loose settings.

DISCLOSURE OF INVENTION

Computer implemented methods, apparati, and computer-readable media for empirically adjusting access to a database (1). An apparatus embodiment comprises: coupled to the database (1), a database discovery module (11) for determining authorized accesses to the database (1); coupled to the database (1), command monitoring module (12) for monitoring actual accesses to the database (1); and coupled to the database discovery module (11) and to the command monitoring module (12), an analysis module (13) for comparing actual accesses with authorized accesses.

BRIEF DESCRIPTION OF THE DRAWINGS

These and other more detailed and specific objects and features of the present invention are more fully disclosed in the following specification, reference being had to the accompanying drawings, in which:

FIG. 2 is a flow diagram illustrating a method embodiment of the present invention.

DETAILED DESCRIPTION OF THE PREFERRED EMBODIMENTS

Figure 1:
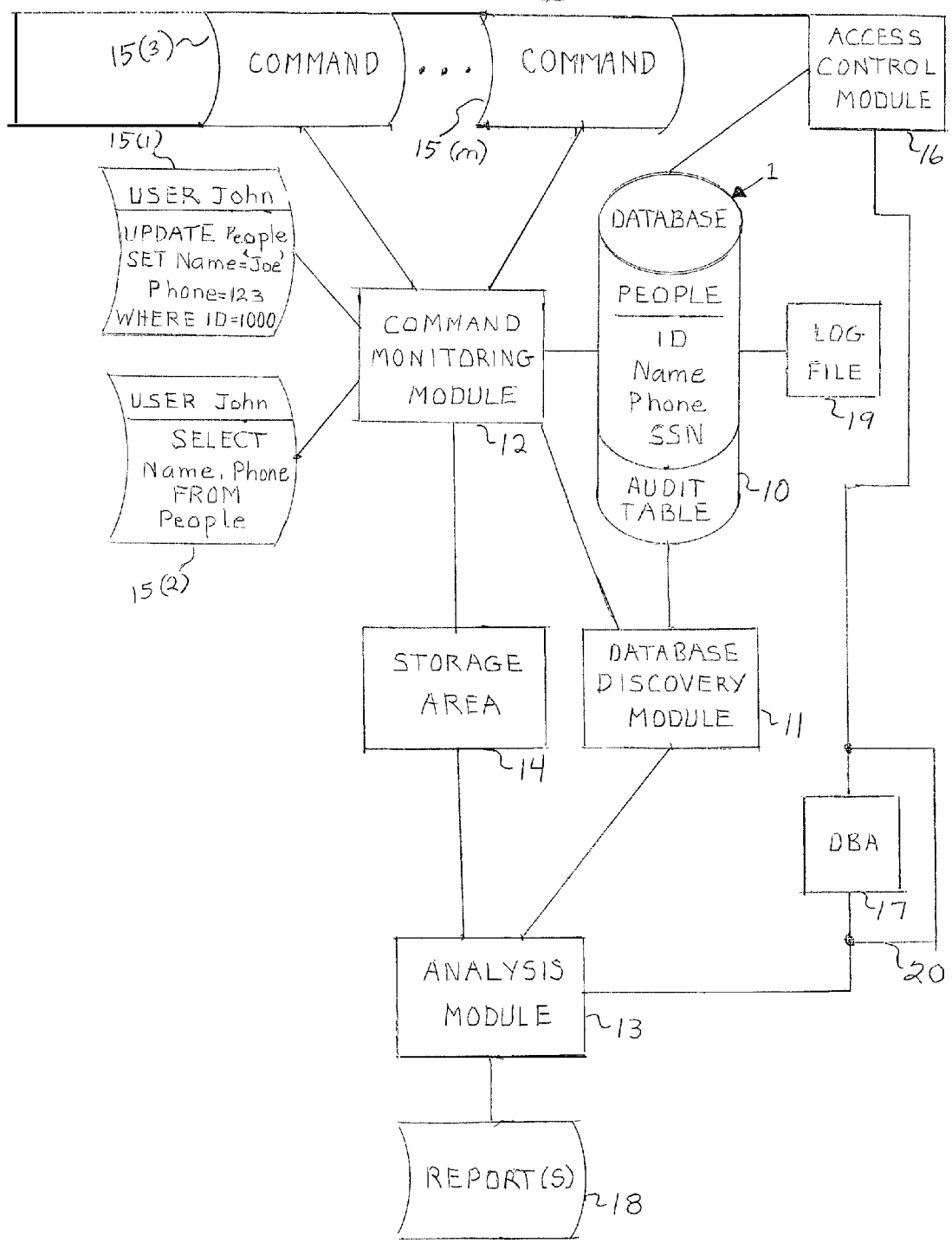
FIG. 1 is a block diagram illustrating apparatus modules suitable for use in the present invention.

"Database" is used broadly herein to comprise any collection of data stored on any computer readable medium. A database normally comprises tables and columns, and is accessed by some query language such as SQL (Structured Query Language).

"Coupled" is used broadly herein to encompass any type of direct or indirect communicative coupling.

FIG. 1 illustrates apparatus suitable for carrying out the present invention. Database 1 can be any type of database, such as a relational database or a flat file. When database 1 is a relational database, commands 15 are typically written in a SQL language. As used herein, "SQL" is taken in the broad sense to mean the original language known as SQL (Structured Query Language, which originated in the IBM Research Labs in 1969), any derivative thereof, or any structured query language used for accessing a relational database.

SQL 92 is the current standard version of SQL. It is published in many places, including on the World Wide Web. Each vendor of a database 1 tends to have its own flavor of SQL, a flavor compatible with SQL 92.

An example of a SQL command 15 is the SELECT command:

SELECT C1,C2 FROM T1,T2

In the above command, a user is attempting to select columns C1 and C2 from T1 and T2. Each of T1 and T2 can be a table or a view. (Views are discussed below.) Without additional information, we don't know whether C1 belongs to T1 or T2; and we don't know whether C2 belongs to T1 or T2.

GRANT, DENY, and REVOKE commands can be used to limit access database 1. Not every database vendor has a REVOKE command. For example, Oracle does not. In this case, DENY is used instead. Most access control modules 16 work on the basis that a DENY command overrides a GRANT command.

In the case where database 1 is not a relational database, the commands can be written in a language other than SQL, such as XML.

Database 1 may have associated therewith an internal audit table 10 and/or an external database log file 19 for storing audit and/or ancillary information pertaining to database 1. Database 1 is typically packaged within a dedicated computer known as a database server, which may also contain communications and other modules. The database server can contain more than one database 1.

Access control module 16 is a hardware, firmware, or software device that determines what users and operations can access the various tables and columns within database 1.

Access control settings within module 16 can be set and/or changed by a human database administrator (DBA) 17.

Database discovery module 11 and command monitoring module 12 are coupled to database 1. The purpose of database discovery module 11 is to i.) determine database 1 structure in terms of its tables and columns, and in terms of artifices (views, stored procedures, etc.) that manipulate the tables and columns, and ii.) determine (uncover) authorized (permitted) accesses to database 1. The purpose of command monitoring module 12 is to monitor actual accesses to database 1. Analysis module 13 is coupled to modules 11 and 12. The purpose of analysis module 13 is to compare actual database accesses with authorized accesses, and to make and implement appropriate decisions based upon the results of such comparisons. Module 13 can generate one or more third party reports 18. Storage area 14 is coupled to modules 12 and 13. The purpose of storage area 14 is to accumulate data generated by command monitoring module 12 during a training phase (observing step 22). Storage area 14 may be part of monitoring module 12.

Modules 11-14 can be implemented in hardware, firmware, software, or any combination thereof. When implemented in software, modules 11-14 can reside on one or more computer-readable media, such as one or more hard disks, floppy disks, CDs, DVDs, etc.

Command monitoring module 12 is usually a sniffer, because a sniffer does not modify the input stream of data emanating from commands 15. Alternatively, monitoring module 12 can be a proxy. A proxy does affect the input stream, because the queries it receives must be rerouted to the database server. The inputs to module 12 are a plurality of commands 15. FIG. 1 illustrates n such commands, where n is a positive integer. Module 12 examines the data streams generated by commands 15 and extracts the relevant information therefrom. Module 12 decrypts commands 15 if commands 15 are encrypted.

A method embodiment of the present invention will now be described in conjunction with FIG. 2.

At step 21, authorized accesses of database 1 are discovered by database discovery module 11. An "authorized access" comprises the following combination: the authorized database 1 (in those embodiments where the database server has more than one database), the authorized table, the authorized column, the authorized operation, and the authorized user. An individual record produced by database discovery module 11 can have the forms:

Permitted [database][table][operation][user]=0 or 1
Permitted[database][table][column][operation][user]=0 or 1

INSERT and DELETE permission settings are made only at the table level, not the column level. One cannot "insert" or "delete" an individual column as this is really an UPDATE operation. So, we will be granting/denying INSERT and DELETE permissions only at the table level. SELECT and UPDATE permission settings can be made at a column granularity, or at a table granularity. Typically, we will be granting/denying SELECT and UPDATE at the column level on a per user basis, unless all of the columns of a given table are granted/denied for a given user for a SELECT or UPDATE, in which case we will do the granting/denying at the table level.

A view V is a command 15 involving multiple tables. An example of a view V is:

CREATE V AS SELECT C1,C2 FROM T1,T2

The discovery step 21 ascertains the definitions of the views associated with database 1, i.e., discovery module 11 resolves the views into individual accessed tables and columns along with the operations used on them. Thus, for example, if a command 15 monitored during the observing step 22 is "SELECT A from V", it is known what columns and tables within database 1 are implicated because discovery module 11 has determined this information.

A stored procedure is a procedure that is performed on the data within database 1. An example of a stored procedure SP1 is:

CREATE SP1 (X,Y) AS STORED PROCEDURE

In the above example, X and Y are parameters representing users, commands, tables, columns, dates, functions, constants, etc. Again, database discovery module 11 resolves (breaks down) each stored procedure into accessed tables and columns along with the operations used on them.

The database discovery module 11 must resolve (break down) any database 1 artifice that performs operations on database tables or columns in a "black box" manner, as do views, stored procedures, user-defined functions, triggers, etc.

In addition to views and stored procedures, user-defined functions and triggers will also be "discovered". In fact, any SQL entity that reads/writes column values or table rows must be discovered. For example, min/max column value checking can be specified using values from other columns. Also, there can be many levels of nesting. T1 (from the above SELECT example) can really be a view (V). But V itself might be composed of other views (and tables), ad infinitum.

Module 11 can be programmed to automatically determine the relevant information. Alternatively, or in addition to information determined automatically by module 11, a human such as DBA 17 can provide information to analysis module 13 regarding authorized combinations. This can be done, for example, if there are complicated views, stored procedures, etc., associated with database 1.

The information uncovered by database discovery module 11 is stored in a storage area, for later use by command monitoring module 12. The storage area can be part f database discovery module 11, or a separate module.

During the observing step (training phase) 22, command monitoring module 12 monitors incoming commands 15, keeping track (by means of updating storage area 14) as to which users perform which operations on which tables and columns within database 1. There are four main operations that are tracked. SELECT is used to read a column value. UPDATE is used to modify (write) a column value. INSERT is used to insert a new row of column values into a table. DELETE is used to delete an existing row of column values from a table.

Monitoring module 12 first breaks down commands 15 into their constituent elements using information provided by database discovery module 11. For example, in the illustration given above, the command SELECT C1,C2 from T1,T2 is ambiguous in that it is not known a priori whether C1 belongs to T1 or T2, it is not known whether C2 belongs to T1 or T2, and it is not known whether T1 and T2 are tables or views. But this information is determined by database discovery module 11 in step 21, and command monitoring module 12 uses this information in step 22 to resolve the command and then store the observed combination in storage area 14. An entry in storage area 14 may have one of the forms:

Observed[database][table][operation][user]=0 or 1
Observed[database][table][column][operation][user]=0 or 1

The duration of the observing step 22 is normally defined in terms of a preselected time period. Alternatively, the duration of observing step 21 can be defined in terms of a preselected number of entries made to storage area 14. In either case, the duration of the observing step 22 should be sufficiently long that monitoring module resolves and records many commands 15, and all expected functionalities of the applications accessing database 1 are exercised. This will enable analysis module 13 to completely understand database access patterns.

Monitoring module 12 can employ any technique of in-line interception or real-time auditing to obtain the desired information.

Real-time auditing can be used in cases where database 1 has an auditing feature. The auditing information may be placed into an audit table 10 internal to database 1 or into an external database log file 19. In real-time auditing, module 12 instructs database 1 to generate a stream of events every time a command 15 enters database 1. The stream can include such items as the text of the command 15, a date/time stamp, information pertaining to the user that issued the command 15, the IP (Internet Protocol) address of the issuing computer, the application that issued the command 15, etc. The stream can appear to module 12 in string or binary form, and can be extracted using a number of different techniques, depending upon the implementation, including APIs (Application Programming Interfaces) that access database 1. One example is to use ODBC (Open DataBase Connectivity), a set of C language API's that allows one to examine or modify data within database 1. If the Java programming language is used, JDBC (Java DataBase Connectivity) can be used instead.

Another way that module 12 extracts the needed information from database 1 is to use code injection or patching to inject logic into one or more modules associated with database 1, to transfer control to module 12.

In another embodiment, called "direct database integration", the database 1 vendor, who has access to the commands 15 in conjunction with the normal operation of the database 1, makes the commands 15 available to module 12.

In yet another embodiment, in cases where database 1 supports it, external database log file 19 may be examined without the need to resort to special software.

Once a command 15 has been processed by module 12, the command 15 can optionally be expunged from any table 10 or log file 19 it is stored in, to make room for subsequent commands 15.

Module 12 normally obtains its information in real time, but, alternatively, the information could be extracted in a non-real time manner, e.g., in those embodiments where audit table 10 or log file 19 is used.

At step 23, analysis module 13 compares the actual accesses of database 1, as gathered in storage area 14, with the normally larger universe of authorized accesses as determined by database discovery module 11. Analysis module 13 can generate a map of which parts (tables and columns) of which database 1 were accessed during step 22 via which operations emanating from which users. The map can then be displayed to DBA 17 by any conventional means. For example, the map can be displayed on a computer monitor, with actual accesses being portrayed in one color, and authorized accesses that were not observed during the observing step 22 portrayed in a different color.

At step 24, analysis module 13 and/or DBA 17 adjust access control settings to database 1, based upon results of comparing step 23 and possibly based upon pre-established criteria. The adjustments are made by changing settings within access control module 16. Such adjustments can include one or more of the following:

1) DBA 17 receives a report from module 13 containing suggested revised access control settings that should be applied to database 1. The suggestion is normally to harden database 1, i.e., impose stricter access control settings. For example, the suggestion may be to deny access to operations by certain users on database 1 columns and tables that were preconfigured to be authorized, but which were not observed during observing step 22.

2) Analysis module 13 is allowed to automatically harden database 1 (for all times of the day), i.e., apply access control settings as determined by module 13. Again, the criterion can be to deny access to operations by certain users on certain columns and tables of certain databases that were preconfigured to be authorized, but which were not observed during observing step 22.

3) Module 13 is allowed to harden database 1 dynamically based upon time of day, i.e., access control module 16 is programmed to harden database 1 during certain times of the day but not during other times.

4) DBA 17 can be alerted by module 13 regardless of time of day or in a time-based access pattern. The alerts can convey those combinations of databases, tables, columns, operations, and users that were preconfigured to be authorized, but which were not observed during observing step 22.

5) Command monitoring module 12 can be allowed to continue monitoring commands 15 past the duration of the observing step 22. During the extended time period, for example, analysis module 13 can be programmed to alert DBA 17 in real time regarding commands 15 that are observed by monitoring module 12 during the extended time period but that were not observed during observing step 22.

Adjustments involving the automatic hardening of database 1 can be implemented by using a bypass connection 20 between analysis module 13 and access control module 16 to bypass DBA 17. The hardening commands can be written as standard SQL commands as supported by database 1, or by using database specific proprietary APIs (Application Programming Interfaces). Examples of such APIs are OCI for an Oracle database 1, or DMO for a Microsoft SQL Server. OCI and DMO are libraries that enable programming languages other than SQL to access database 1, by translating the commands into SQL. OCI is a set of subroutines in programming language C. DMO uses COM objects in C or in Visual Basic.

In optional step 25, analysis module 13 generates one or more third party reports 18, e.g., a regulatory compliance report such as the data security report required by HIPAA (Health Insurance Portability and Accountability Act). As used herein, "third party" means a report to be processed by an entity other than DBA 17 or access control module 16.

Normal operations of database 1 can continue uninterrupted during steps 21-25 of the present invention. This is an important attribute.

Returning to FIG. 1, we see an exemplary database 1 having one table (People) with four columns (ID, Name, Phone, and Social Security Number). Command monitoring module 12 monitors two incoming commands 15 from user John. Command 15(1) is an UPDATE, and command 15(2) is a SELECT. Module 12 monitors these commands 15 and dissects which operations are being performed on which tables and columns within database 1. At step 23, analysis module 13 concludes that user John has not selected column SSN, has not updated column ID, and has not updated column SSN. (John has implicitly selected column ID, because of the WHERE subcommand embedded within command 15(1)). At step 24, module 13 can perform one or more tasks as described above, such as to automatically deny future access to John to these unobserved combinations, generate an alert to DBA 17 if a subsequent command 15 arrives that attempts to access one of these previously unobserved combinations, etc.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. An apparatus for empirically adjusting a user's authorized access to a database, the apparatus comprising:
    a non-transitory computer-readable storage medium storing executable computer program modules comprising:
        a database discovery module configured to determine a structure of the database and the user's authorized access to the database, the user's authorized access including a set of authorized database tables and authorized columns;
        a command monitoring module configured to monitor the user's actual accesses to the database until a preselected quantity of actual accesses have been observed, the user's actual accesses including a set of accessed database tables and accessed columns; and
        an analysis module configured to compare the user's actual accesses with the user's authorized access and configured to adjust the user's authorized access taking into account results of the comparing by changing settings within a database access control module to deny the user future database access to an authorized database table or an authorized column that is not in the set of accessed database tables and accessed columns; and
    a processor for executing the computer program modules.

2. The apparatus of claim 1 further comprising a storage area configured to accumulate data generated by the command monitoring module.

3. The apparatus of claim 1 wherein the command monitoring module is a sniffer.

4. The apparatus of claim 1 wherein the database is a relational database accessed by a structured query language.

5. The apparatus of claim 1, wherein the preselected quantity of actual accesses is sufficiently large that all expected functionalities of applications accessing the database are exercised.

6. A computer-implemented method for empirically adjusting a user's authorized access to a database, the method comprising the steps of:
    discovering the user's authorized access to the database, the user's authorized access including a set of authorized database tables and authorized columns;
    observing the user's actual accesses to the database until a preselected quantity of actual accesses have been observed, the user's actual accesses including a set of accessed database tables and accessed columns;
    comparing the user's actual accesses with the user's authorized access; and
    adjusting the user's authorized database access taking into account results of the comparing step by changing settings within a database access control module of a computer-implemented database server to deny the user future database access to an authorized database table or an authorized column that is not in the set of accessed database tables and accessed columns.

7. The method of claim 6 further comprising the step of generating and storing at least one report based upon observing the user's actual accesses to the database.

8. The method of claim 6 wherein the discovering step uncovers any:
    tables of the database;
    columns of the database;
    views of the database;
    stored procedures of the database;
    user-defined functions of the database; and
    triggers of the database.

9. The method of claim 6 wherein the adjusting step further comprises at least one of:
    suggesting revised database access control settings to a database administrator;
    automatically hardening the database for all times of day;
    automatically hardening the database selectively based on time of day;
    alerting a database administrator; and
    continuing to monitor the user's accesses to the database after conclusion of the observing step.

10. The method of claim 9 wherein the database is automatically hardened using standard SQL commands.

11. The method of claim 9 wherein the database is automatically hardened using database specific application programming interfaces.

12. The method of claim 6, further comprising:
    storing data generated by the observing of the user's actual accesses to the database in a storage area.

13. The method of claim 6, further comprising:
    generating a map of which tables and columns of the database were accessed during the observing.

14. The method of claim 6, further comprising:
    monitoring the user's actual accesses to the database during an extended period occurring after the preselected quantity of actual accesses have been observed; and
    generating an alert in real time regarding the user's actual accesses that are observed during the extended period that were not observed within the preselected quantity of the user's actual accesses.

15. A non-transitory computer-readable medium containing executable computer program instructions configured to empirically adjust a user's authorized access to a database, the computer program instructions performing the steps of:
    discovering the user's authorized access to the database, the user's authorized access including a set of authorized database tables and authorized columns;
    observing the user's actual accesses to the database until a preselected quantity of actual accesses have been observed, the user's actual accesses including a set of accessed database tables and accessed columns;
    comparing the user's actual accesses with the user's authorized access; and
    adjusting the user's authorized database access taking into account results of the comparing step by changing settings within a database access control module of a computer-implemented database server to deny the user future database access to an authorized database table or an authorized column that is not in the set of accessed database tables and accessed columns.

16. The computer-readable medium of claim 15 further comprising the step of generating and storing at least one report based upon observing the user's actual accesses to the database.

17. The computer-readable medium of claim 15 wherein the discovering step uncovers any:
    tables of the database;
    columns of the database;
    views of the database;
    stored procedures of the database;
    user-defined functions of the database; and
    triggers of the database.

18. The computer-readable medium of claim 15 wherein the adjusting step further comprises at least one of:

suggesting revised database access control settings to a database administrator;
automatically hardening the database for all times of day;
automatically hardening the database selectively based on time of day;
alerting a database administrator; and
continuing to monitor the user's accesses to the database after conclusion of the observing step.

19. The computer-readable medium of claim 18 wherein the database is automatically hardened using standard SQL commands.

20. The computer-readable medium of claim 18 wherein the database is automatically hardened using database specific application programming interfaces.

* * * * *